April 21, 1942.                L. D. MEAD                2,280,157
                          STAND DRIVE VEHICLE
                        Filed July 13, 1940           5 Sheets-Sheet 1
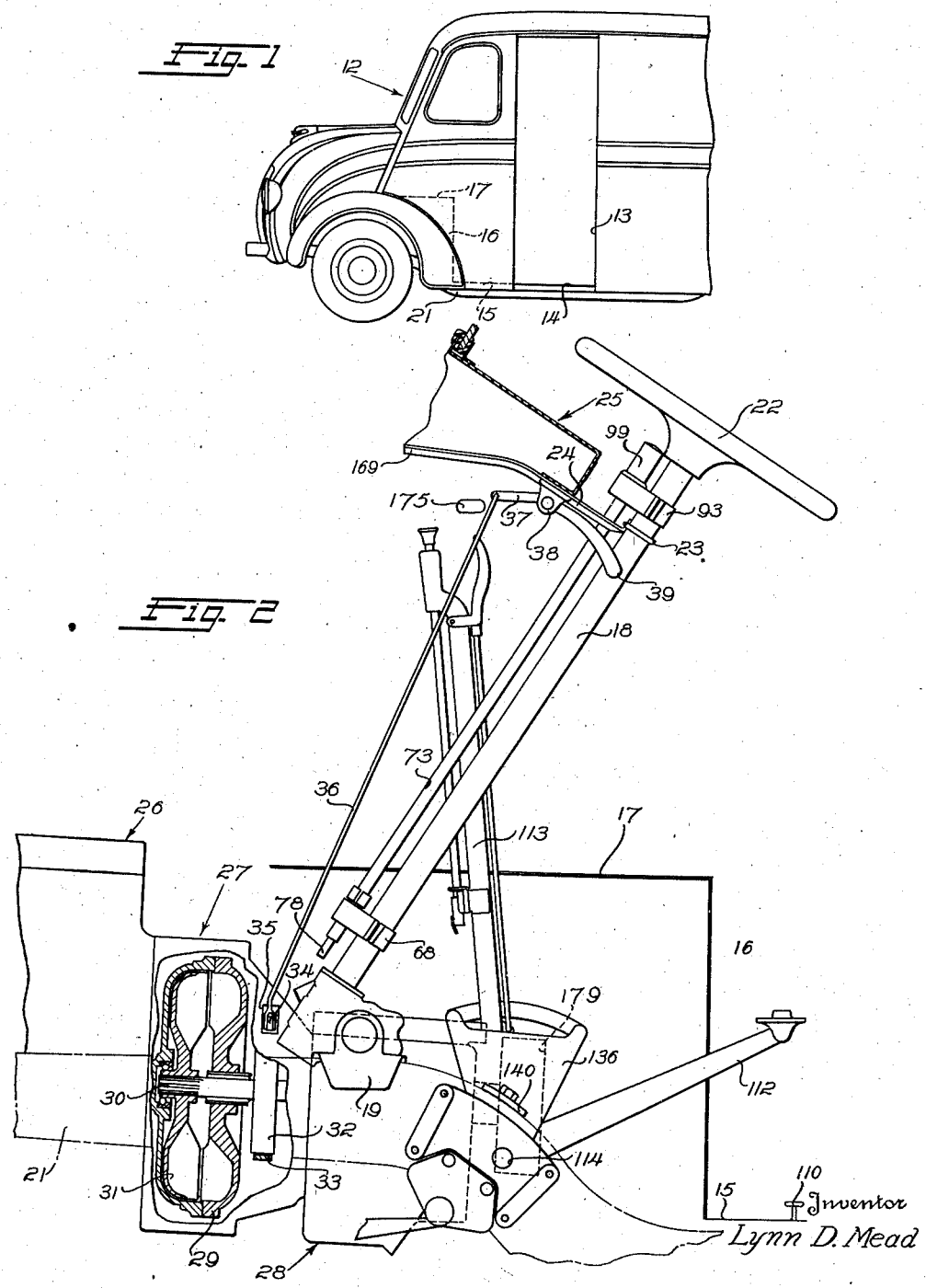
Inventor
Lynn D. Mead
By Strauch & Hoffman
Attorneys April 21, 1942.  L. D. MEAD  2,280,157
STAND DRIVE VEHICLE
Filed July 13, 1940   5 Sheets-Sheet 2

Inventor
Lynn D. Mead
By Strauch & Hoffman
Attorneys

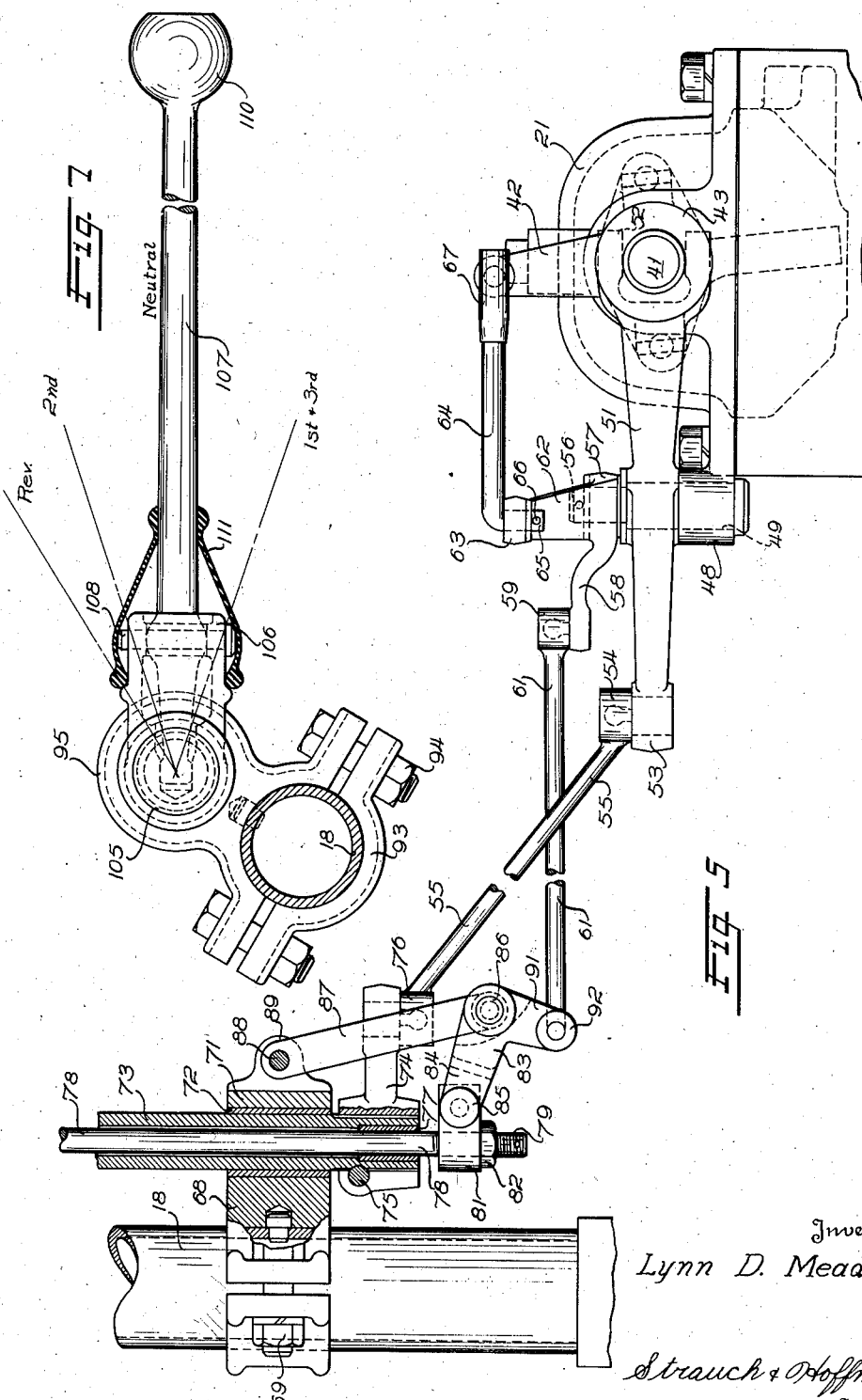

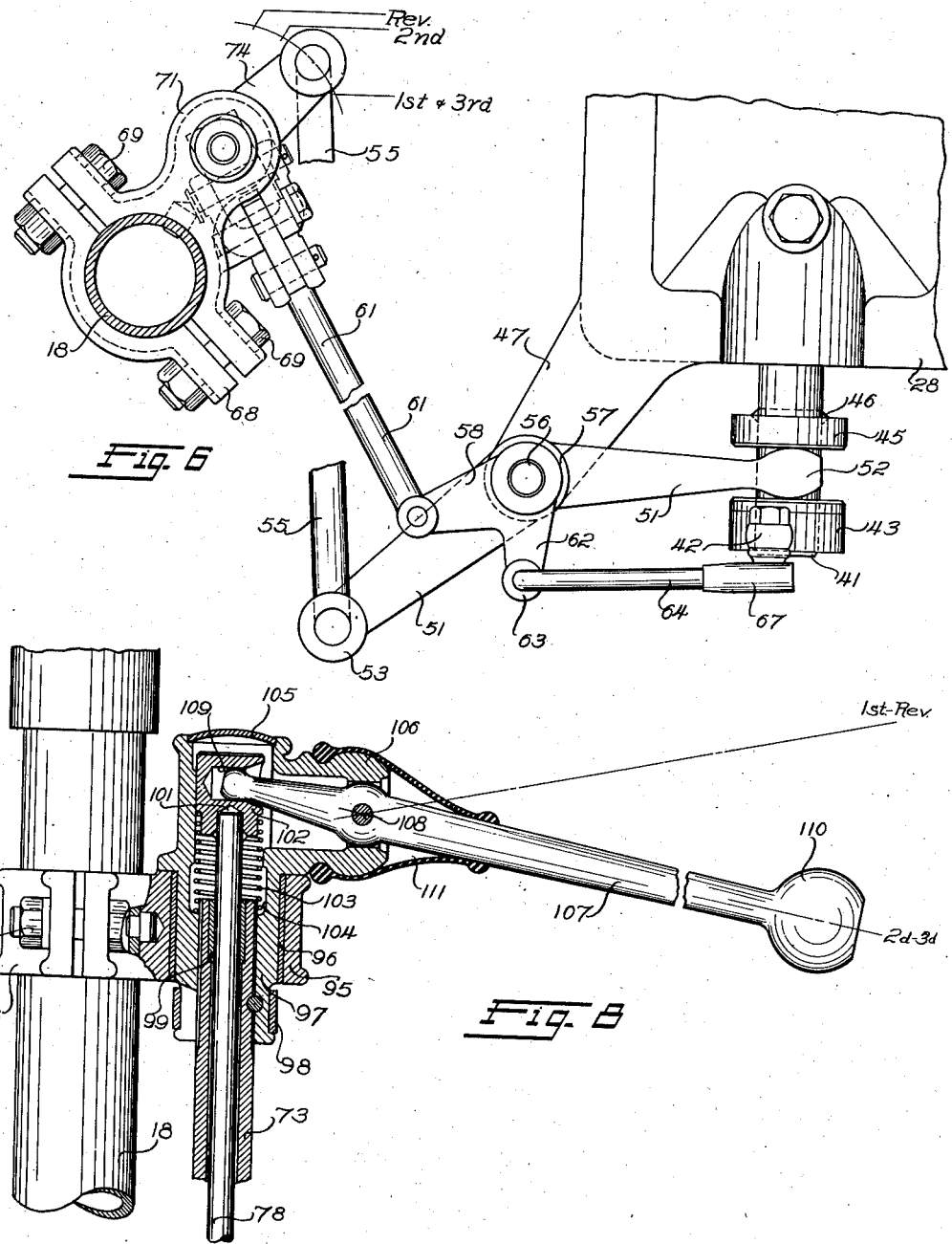

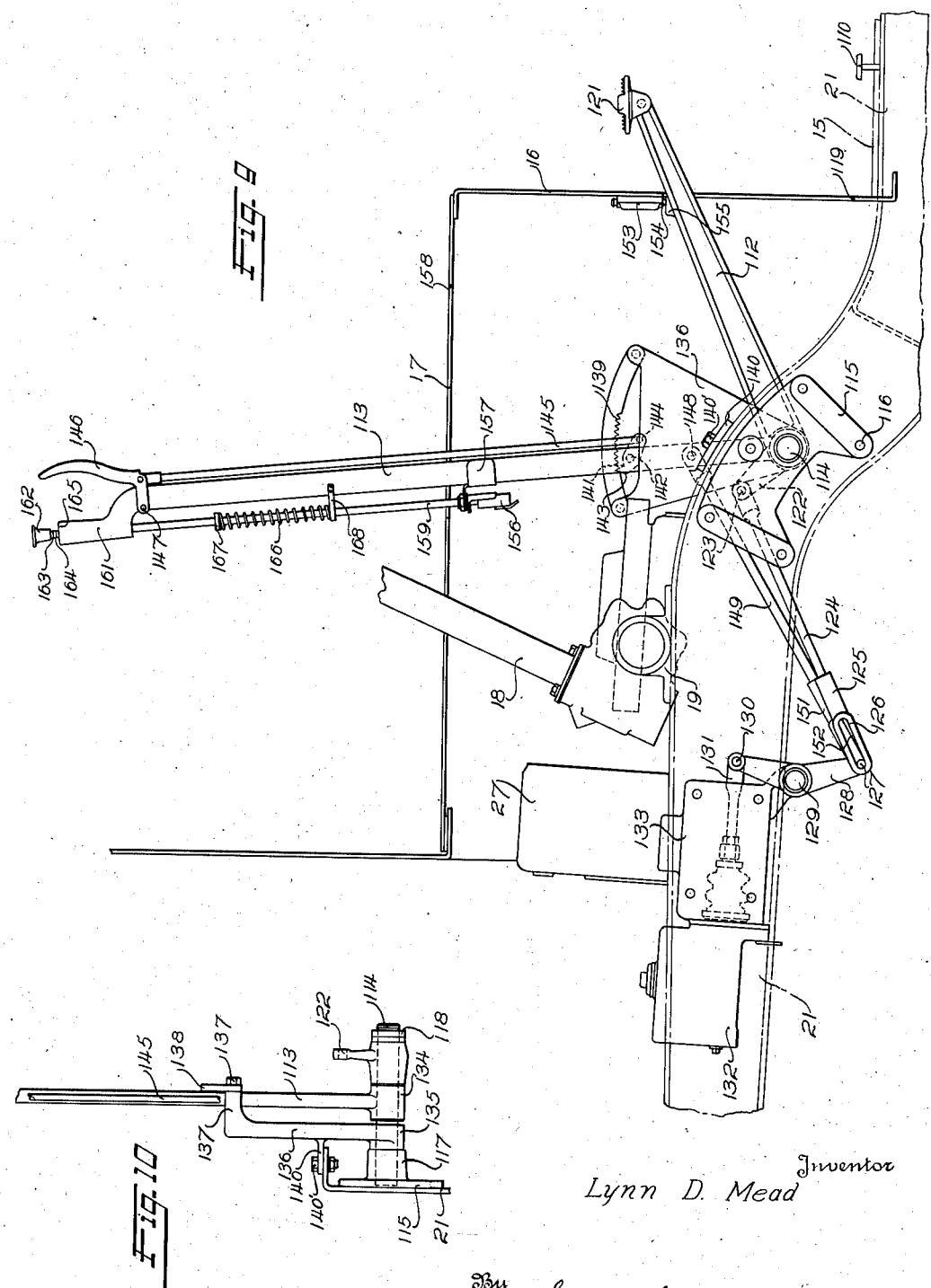

Patented Apr. 21, 1942

2,280,157

UNITED STATES PATENT OFFICE 2,280,157

STAND DRIVE VEHICLE

Lynn D. Mead, Detroit, Mich., assignor to Divco-Twin Truck Company, Detroit, Mich., a corporation of Michigan Application July 13, 1940, Serial No. 345,396

2 Claims. (Cl. 180—77)

The present invention relates to vehicles designed to be driven from standing position and is more particularly concerned with improvements in the drive and control of such stand drive vehicles.

Stand drive vehicles which are constantly growing in importance in the commercial delivery field, especially milk delivery, have been greatly improved in recent years by special body constructions and rearranged and combined controls with the object of reducing fatigue of the driver and increasing his efficiency and speed during delivery.

The present invention is designed to further increase driver efficiency and speed by incorporating special drive arrangements in stand drive vehicles, while eliminating at least one control heretofore embodied in such vehicles, and regrouping and redesigning the remaining controls in accordance with my observations over years of work in this field.

Experiments have shown that considerable time and energy is consumed in operating the clutch pedal in the ordinary delivery vehicle. In my invention the usual clutch operation is entirely eliminated, thereby simplifying and speeding up operation of the vehicle.

With the above in mind it is a major object of the present invention to provide a stand drive vehicle embodying novel drive and control arrangements designed to promote speed and efficiency of operation and reduce driver fatigue.

A further object of the invention is to provide a novel stand drive vehicle wherein the engine is connected to a shiftable gear transmission by an automatic power transmitting unit, such as a hydraulic drive unit, so that no clutch pedal manipulation is necessary for operation of the vehicle; and wherein special controls for the transmission and hydraulic drive unit are provided. Preferably this hydraulic unit is of the so-called Fottinger or "fluid flywheel" type.

A further object of the invention is to provide a novel stand drive vehicle wherein the controls are specially built and grouped adjacent the steering wheel for efficient and simplified stand drive operation of the vehicle.

A further object of the invention is to provide a novel stand drive vehicle control wherein a combined ignition and starter switch and operator therefor is supported on a hand brake lever.

A further object of the invention is to provide novel dual control mechanism for the service brakes of a stand drive vehicle.

Further objects of the invention will presently appear as description of the invention proceeds in connection with the appended claims and annexed drawings in which:

Figure 1 is a diagrammatic view of a stand drive vehicle incorporating the present invention.

Figure 2 is a side elevation partly broken away and partly in section illustrating the drive and control elements of the invention in assembly.

Figure 5 is a side elevation, partly in section, illustrating linkage connecting the lower end of the gear shifting and selector rods to the transmission unit.

Figure 6 is a top plan view, partly in section, of the assembly of Figure 5.

Figure 7 is a top plan view, partly in section, of the transmission operating lever on the steering post.

Figure 8 is a side elevation, partly in section, of the transmission operating lever and its connection to the gear shifting and selector rods.

Figure 9 is an enlarged side elevation of the service brake operating mechanism.

Figure 10 is a fragmentary view in end elevation of the bracket supporting the service brake mechanism on the chassis.

Figure 4:
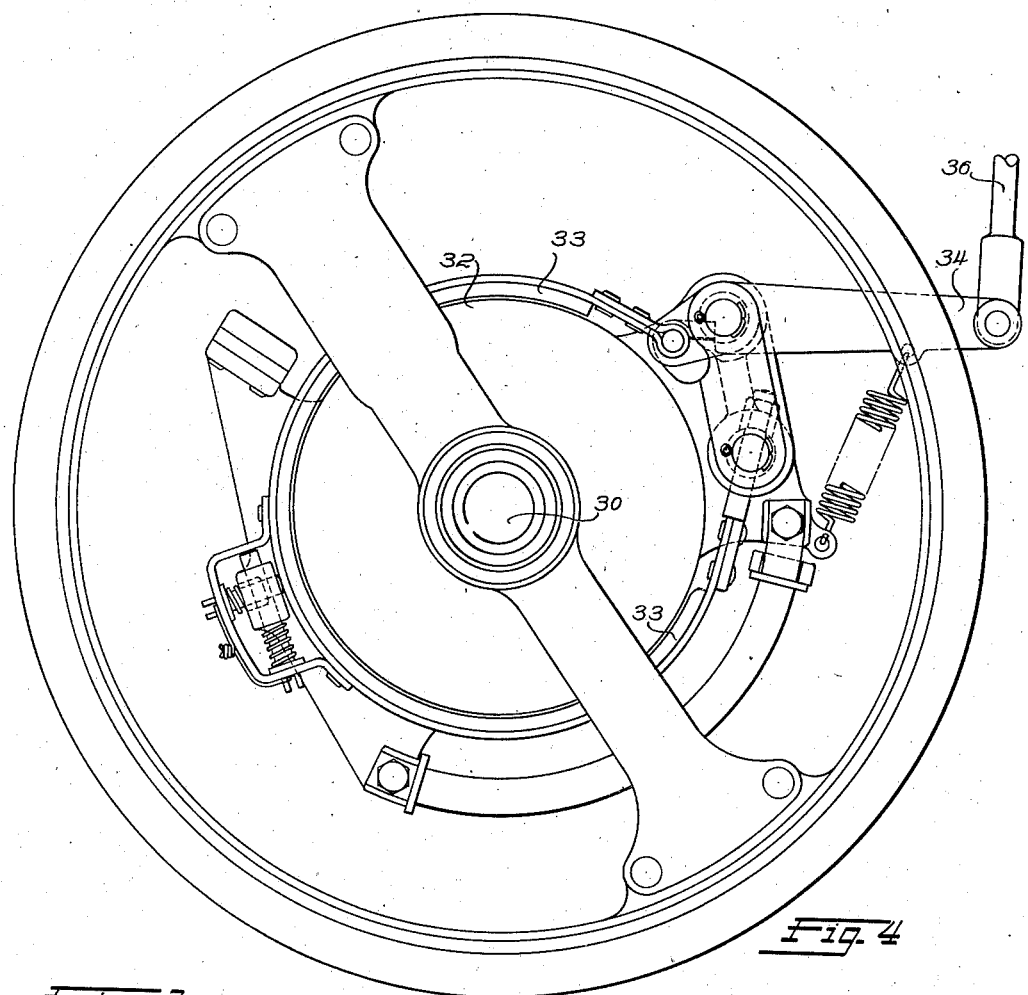
Figure 4 is a diagrammatic end view illustrating the brake on the driven element of the hydraulic power transmitting unit.

Referring to Figure 1, a stand drive vehicle 12 has a side doorway 13 opening to a low floor 14 within the body. Floor 14 is located in a horizontal plane below the level of the plane containing the vehicle supporting wheel axes and disposed only a single short step above the ground on which the wheels rest, and is spaced from the roof to provide standing height clearance within the body.

Floor 14 is provided with an extension 15 forwardly of the doorway, and the front end of extension 15 is connected to a vertical cross panel 16 which rises to an elevated front floor 17. Floor extension 15 provides a stand drive compartment wholly forwardly of doorway 13.

A steering post 18 is supported at its lower end by a bracket 19 rigid with chassis rail 21. The upper end of post 18 carries a steering wheel 22 and is supported by a U-clamp 23 rigid with a bracket 24 extending from the transverse dashboard assembly 25.

As illustrated in Figure 2, the vehicle drive mechanism comprises an engine 26, a hydraulic power transmitting unit 27 and a shiftable gear transmission 28. Transmission 28 is connected to the drive wheels by the usual propeller shaft (not shown).

Hydraulic power transmitting unit 27 is preferably of the Fottinger type wherein an impeller or drive element 29 is secured to the motor shaft and a turbine or driven element 31 is secured to the transmission input shaft 30. A brake drum 32 is rigid with turbine element 31. A brake band 33 surrounds drum 32 (Figure 4) and is actuated by a pivoted lever 34 which extends exteriorly of unit 27 through a suitable aperture 35 (Figure 2).

The above-described hydraulic power transmitting elements are of known construction and may for example be of the type disclosed in the United States Patent to Boldt No. 2,076,362.

A rod 36 is pivoted at opposite ends to lever 34 and a brake actuating lever 37. Lever 37 is pivoted intermediate its ends at 38 on dashboard 25 and has an arcuate handle 39 projecting within easy reach of a driver standing behind wheel 22. Pressure of the driver's hand on handle 39 rotates lever 37 clockwise (Figure 2), thereby effecting upward displacement of rod 36 and counterclockwise rotation (Figure 4) of lever 34 to tighten brake band 33 on drum 32 and thereby reduce or stop rotation of shaft 30 for a purpose to be described.

*Transmission control*

Transmission unit 28 is of the usual shiftable gear type wherein an axially slidable and rotatable control shaft 41 (Figure 6) projects rearwardly from the transmission housing. A selector arm 42 is formed with a hollow boss 43 rigidly secured upon the outer end of shaft 41. A collar 45 is spaced inwardly from boss 43 and secured rigidly to shaft 41 as by fastening element 46.

Referring to Figures 5 and 6, the housing of transmission unit 28 is formed with a rigid projection 47 terminating in an apertured boss 48 in which a vertical shaft 49 is non-rotatably supported. A generally horizontal shifter lever 51 is pivotally supported intermediate its ends on shaft 49. Lever 51 is formed at its inner end with a fork or bifurcated portion 52 slidably and rotatably embracing shaft 41 between collar 45 and boss 43. The outer end of lever 51 is formed with a boss 53 connected by a suitable universal joint, such as ball and socket assembly 54, to the lower end of a rod 55 connected to the suitable shifter control mechanism on the steering post as will appear.

Above lever 51, shaft 49 is formed with a reduced terminal 56 upon which a bell crank lever 57 is pivotally mounted intermediate its ends. Lever 57 comprises a laterally and upwardly projecting arm 58 universally connected, as by ball and socket assembly 59, to the rear end of a rod 61 from the transmission selector control mechanism on the steering post, and a rearwardly and upwardly projecting arm 62 terminating in an apertured boss 63.

A short horizontal rod 64 having a downturned end 65 rotatable within boss 63, but secured against axial displacement as by cotter 66, is universally connected, as by ball and socket assembly 67, to the upper end of selector arm 42.

A two part bracket 68 is rigidly but removably clamped upon the lower end of steering post 18, as by bolt assemblies 69. One part of bracket 68 is formed with a laterally projecting apertured boss 71 lined with a bushing 72 rotatably receiving the lower end of a hollow shifter tube 73. Tube 73 terminates below bracket 68 and a laterally extending arm 74 is suitably non-rotatably secured upon its end, as by the fastening element indicated at 75.

The outer end of arm 74 is universally connected, as by ball and socket assembly 76, to the upper end of rod 55.

At its lower end tube 73 is lined with a bushing 77 slidably receiving the lower end of a concentric selector rod 78 within the tube. Rod 78 terminates in a threaded portion 79 fitting into a tapped block 81. Block 81 is maintained in a desired axial position on rod 78 as by locknut 82.

A bell crank lever 83 has a bifurcated arm 84 attached to block 81 by pivot assembly 85 and is pivoted intermediate its ends on a shaft 86 carried by the lower end of a link 87. The upper end of link 87 is pivotally mounted at 88 between a pair of integral ears 89 on boss 71. The other arm 91 of lever 83 extends downwardly and is pivoted to the front end of rod 61.

Just below steering wheel 22, a two part bracket 93 is rigidly but removably clamped to the upper end of post 18, as by bolt assemblies 94. One part of bracket 94 is formed with a large hollow boss 95 lined with a bushing sleeve 96 and rotatably supporting a hollow cylindrical block 97. The upper end of tube 73 is non-rotatably secured within block 97, as by the clamping elements indicated at 98.

The upper end of tube 73 is lined with a bushing 99 slidably receiving the upper end of rod 78 which projects upwardly into a suitable aperture 101 in the bottom of an axially slidable and rotatable element 102 within block 97 and spaced from the upper end of tube 73. A coil spring 103 extends between element 102 and a suitable internal shoulder 104 on block 97. The upper end of block 97 is closed by a removable cap 105.

Block 97 is formed with a laterally projecting hollow boss 106 within which a gear shift lever handle 107 is pivoted intermediate its ends at 108. The inner end of lever 107 is rockably fitted within an aligned lateral aperture 109 in element 102, and the outer end of lever 107 terminates in a manual knob 110 beneath wheel 22. The joint between lever 107 and boss 106 is sealed by a flexible collar 111.

Shift lever 107 is convenient to a driver standing on floor 15 behind wheel 22. When lever 107 is rocked in a substantially horizontal plane between the various positions indicated in Figure 7, such causes rotation of block 97 and tube 73 which, through arm 74, rod 55 and lever 51, effects sliding or gear engaging movement of shaft 41.

When shift lever 107 is rocked about pivot 108 between the various positions illustrated in Figure 8, such causes vertical displacement of element 102 and rod 78 and, through bell crank 83, rod 61, bell crank lever 57, rod 64 and arm 42, effects rocking or gear selector movement of shaft 41.

*Service brake control*

Dual independent controls for the service brakes of the vehicle comprise a foot pedal 112 and an elongated hand lever 113 pivotally mounted side by side on a stub shaft 114 which projects inwardly from a bracket 115, secured to chassis rail 21 as by bolt or rivet assemblies 116. Shaft 114 is non-rotatably mounted in a suitable integral boss 117 on bracket 115. The inner end of shaft 114 is supported by a brace 118 rigid with a transverse member (not shown) of the chassis.

Pedal 112 projects through a suitable aperture 119 in wall 16 and terminates in a pad 121 above floor 15. At its inner end, pedal 112 is formed with an integral arm 122, generally perpendicular thereto, which is pivotally connected at 123 to the rear end of a brake rod 124. The front end of rod 124 is formed with a head 125 having an axially elongated slot 126 into the forward end of which is slidably and rotatably fitted a pin 127 rigid with the lower end of a lever 128 pivoted intermediate its ends about a transverse axis at 129 and pivotally connected at its upper end at 130 with piston rod 131 of a master hydraulic cylinder 132 for actuating the service brakes.

Preferably pivot 129 is supported upon a rigid part of motor support bracket 133 which also carries the master cylinder 132.

The lower end of hand lever 113 is formed with an enlarged boss 134 surrounding shaft 114. Between bosses 117 and 134, shaft 114 extends through an apertured boss 135 formed at the apex of a vertical inverted triangular plate 136 which has an integral outwardly projecting lug 140 secured to the top of rail 21 as by bolts 140'. Plate 136 thereby supports an inner portion of shaft 114. Shaft 114 in turn provides a support for the lower end of plate 136 and cooperates with lug 137 in maintaining plate 136 rigid with the chassis.

The upper side of plate 136, opposite apex 135, is arcuate and has rigidly secured thereto, as by screws 137, an arcuate ratchet element 138 having a downwardly facing row of teeth 139 concentric with the axis of shaft 114.

A toothed dog 141 is pivoted intermediate its ends at 142 on lever 113 and is shaped at its toothed end 143 to interfit with ratchet teeth 139. The other end of dog 141 is pivotally connected at 144 to the lower end of a rod 145, and the upper end of rod 145 is pivotally connected to a manually operable handle 146 pivoted at one end at 147 on the upper end of lever 113. A suitable spring (not shown) is preferably employed to urge dog 141 clockwise and maintain handle 146, rod 145 and dog 141 in engaged position as in Figure 9.

Between boss 134 and dog 141, lever 113 carries a pivot assembly 148 to which the rear end of brake rod 149 is attached. At its forward end, head 151 of rod 149 is slotted at 152 to fit slidably and rotatably over in 127 beside head 125.

Depression of pad 121 rocks pedal 112 clockwise about shaft 114 and, through arm 122, rod 124 and lever 128, causes brake applying operation of cylinder 132. During this movement of pedal 112, lever 113 does not move since slot 152 provides a lost motion connection with pin 127.

For hand operation of the service brakes, handle 146 is squeezed to rotate it counterclockwise thereby withdrawing dog tooth 143 from rack teeth 139. Lever 113 is now rocked clockwise about shaft 114 and, through rod 149 and lever 128, causes brake applying operation of cylinder 132. Pedal 112 does not move during this actuation of lever 113 since slot 126 provides a lost motion connection with pin 127.

The usual heavy return springs (not shown) are provided for the brake linkage of Figure 9.

Pedal 112 and lever 113 are thereby independently operable by the foot and hand of the driver to apply the service brakes. Handle 146 is close to the steering wheel 22 so as to be readily accessible to the hand of a standing driver. Ratchet mechanism 139, 141 enables the service brake to be normally used as a parking brake.

A stop light switch 153 is mounted on the inner face of wall 16 and has a switch button 154 adapted to seat upon an abutment 155 integral with pedal 112. Switch button 154 is shown in the "off" position in Figure 9 and is of the type which is spring urged to "on" position when pedal 112 is rocked clockwise downwardly therefrom. Return of pedal 112 restores button 154 to normal "off" position.

*Ignition and starter switch*

A combined engine ignition and starter switch unit 156 is secured, as by a bracket 157, upon lever 113 just below slot 158 in floor 17. A switch operating plunger rod 159 has its lower end slidably carried by bracket 157 and is slidably received at its upper end by an offset integral portion 161 on lever 113. Above offset 161, rod 159 terminates in an enlarged push button 162.

Just below button 162, rod 159 is marked with indicia lines 163 and 164 labelled "Ignition on" and "Starter," respectively. When it is desired to start the engine, the driver presses downwardly on button 162 until line 164 is level with the top edge 165 of offset 161 which serves as a fiducial mark. This depresses rod 159 to close the ignition switch within switch unit 156.

Further downward pressure on rod 159 until line 163 is level with fiducial edge 165 closes the starter switch within unit 156, the ignition switch remaining closed. After the engine has started, button 162 is released and a suitable spring 166, reacting between a collar 167 rigid with rod 159 and a bracket 168 rigid with lever 113, returns rod 159 upwardly until line 164 is level with edge 165 where it remains while the vehicle is in operation.

Spring 166 is not of sufficient strength to return rod 159 to the "ignition off" position shown in Figure 9. This must be accomplished by pulling upwardly on button 162. Spring 166 is, however, of sufficient strength to prevent accidental downward displacement of rod 159 from the position shown in Figure 9.

Switch unit 156 may be of any suitable design for the purpose and further description is believed unnecessary. Suitable electrical leads (not shown) extend from switch unit 156 to the ignition coil, battery, starter and other units.

The above described switch assembly is especially valuable in stand drive vehicles. The driver may step into the vehicle and release the parking brake 113, close the ignition circuit and start the engine with practically a single motion of his hand. Similarly he may shut off the engine and pull back brake lever 113 with substantially a single motion of his hand when stopping the vehicle.

*Propeller shaft brake control*

Figure 3:
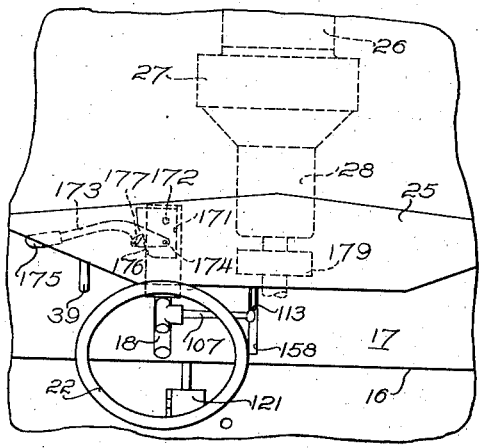
Figure 3 is a fragmentary top plan view of the controls within the front end of the vehicle.

As illustrated in Figures 2 and 3, a generally horizontal support plate 171 is secured to dash assembly 25 as by bolts 172. A brake lever 173 is pivoted about a vertical axis at 174 on plate 171 and extends laterally from beneath the dash assembly to terminate in a handle 175 accessible to the left hand of the driver behind wheel 22.

Plate 171 is formed with ratchet teeth 176 cooperating with a pivoted dog 177 actuated by a suitable pivoted latch member on the brake lever to maintain lever 173 in applied or release position as desired.

Pivotal motion of lever 173 is transmitted through a suitable link and cable mechanism (not shown) to propeller shaft brake 179 (Figure 3).

Brake lever 173 is provided to satisfy state laws requiring two separate sets of brake mechanism on each vehicle. It is ordinarily used only for emergency situations where the service brakes may be faulty, or for long periods of parking. For ordinary house to house stops, such as the ordinary milk vehicle is required to make, the driver mainly uses lever 113 as the parking brake.

*Operation*

The driver steps into the vehicle and, with gear shift lever 107 in neutral position, closes the ignition circuit and starts the engine by pressing knob 162 downwardly as above described. Usually this is accomplished with the same motion used to release brake lever 113 if the latter is in brake applied position. Upon release of knob 162, rod 159 returns to "ignition on" position. Brake lever 173 is then released.

With the motor running and the transmission gears in neutral, sufficient power is transmitted through fluid drive unit 27 to cause idle rotation of transmission input shaft 30. Before lever 107 is shifted to initially mesh the transmission gears, the driver rocks lever 39 with his left hand to brake shaft 30 and enable the gears to be meshed without clashing. The gears are then meshed in low speed by shifting lever 107, the engine accelerated by depressing throttle control pedal 110 and the vehicle driven away.

Further shifting of lever 107 to select higher speeds is made after the vehicle has started. Brake lever 39 need not be manipulated in shifting to these higher speeds.

After reaching the first stop in traffic, the driver merely shifts lever 107 to a lower speed and drives away by accelerating the engine. No manipulation of lever 39 is required here as the transmission is already in gear.

Upon reaching the first delivery stop, the driver merely applies the service brakes and sets brake lever 113 for parking and alights to make his delivery. The vehicle is usually left in gear with the motor running. After delivery, the driver steps back into the vehicle, releases brake lever 113, shifts lever 107 if necessary to select a starting speed and drives away. No manipulation of lever 39 is required as the transmission has been left in gear. These operations are repeated many times along the delivery route.

When the vehicle is parked for a long period, or upon its return to its station, the engine is stopped by pulling upwardly on button 162 while pulling back on lever 113. To resume operation after such a stop, it is necessary to manipulate lever 39 to brake transmission shaft 30 as above-described before initial meshing of the gears.

All of the essential controls of the vehicle are grouped about the steering post so as to be within easy reach of the driver standing behind wheel 22. Elimination of the usual clutch pedal by use of the fluid drive cuts down appreciably the time and labor required to operate the vehicle.

By combining the ignition and starter switches into a single unit and locating the manual control member for that unit at the top of the parking brake lever, starting and stopping of the vehicle is simplified to a marked degree.

I find that a driver operating the vehicle of the invention is enabled to complete his delivery route more efficiently and quickly than possible in previously known vehicles. These beneficial results flow directly from the scientifically planned drive and grouping of the controls above-described.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. In a vehicle, an engine; a hydraulic drive member coupled to said engine, a hydraulic driven member having a brake, and a shiftable gear transmission connected to said driven member; a low floor within the vehicle spaced from the roof to provide standing height clearance; a steering post forwardly of said floor; a lever movably mounted on the upper portion of said post; a plurality of rods supported by said post and connected at their upper ends to said lever; motion transmitting links connecting the lower ends of said rods to said shiftable gear transmission; a dash board assembly within said vehicle, a bracket rigid with said assembly supporting the upper end of said post; a second lever movably mounted on said assembly; and means connecting said second lever to the brake on said driven member, both of said levers being conveniently accessible to an operator standing behind the wheel on said floor.

2. In a vehicle, an engine; a hydraulic drive member coupled to said engine, a hydraulic driven member having a brake, and a shiftable gear transmission connected to said driven member; a low floor within the vehicle spaced from the roof to provide standing height clearance; a steering post forwardly of said floor; a lever movably mounted on the upper portion of said post; motion transmitting mechanism connecting said lever with said shiftable gear transmission; a dash board assembly within said vehicle, a bracket rigid with said assembly supporting the upper end of said post; a second lever movably mounted on said assembly; and means connecting said second lever to the brake on said driven member, both of said levers being conveniently accessible to an operator standing behind the wheel on said floor.

LYNN D. MEAD.